United States Patent Office 3,361,727
Patented Jan. 2, 1968

3,361,727
SEPARATION OF MIXTURES OF OLEFINS
Eugene F. Lutz, Littleton, Colo., assignor to Marathon Oil Company, Findlay, Ohio, a corporation of Ohio
No Drawing. Filed Mar. 28, 1963, Ser. No. 268,582
10 Claims. (Cl. 260—93.7)

This invention relates to the separation of mixtures of olefins and more particularly to the separation of 1-n-olefins from mixtures containing other 1-olefins and internal olefins.

Refinery streams often contain mixtures of olefins and alkanes having physical characteristices which render separation of the mixtures by usual means difficult. For example, one fraction of light catalytic gasoline contains 1-n-pentene, 2-methyl-1-butene, and pentane. These compounds have boiling points of 30°, 31°, and 36.2° C., respectively. While pentane can be readily separated from the olefins by distillation, it is very difficult to separate the isomeric olefins by this method. As 2-methyl-1-butene is a raw material in the production of isoprene, there is considerable need for a process for separating these olefinic isomers. I have now discovered a process for removing 1-n-olefins from refinery streams containing mixtures of α-olefins and internal olefins whereby valuable monomers, such as 2-methyl-1-butene, can be economically recovered.

It is surprising to find that this result is possible in light of the teachings of the prior art. Gaylord and Mark, Polymer Reviews, 2, "Linear and Stereoregular Addition Polymers," Interscience Publishers, Inc., 1959, p. 133–4 and 380–90, indicate that where mixtures of pure 1-olefins are treated with a Ziegler-Natta catalyst, copolymers are formed. It was, therefore, very surprising to find that a substantially pure homopolymer of 1-n-olefins is prepared, when a refinery stream is used as a raw material, leaving substantially pure mixtures of other 1-olefins and, if present, internal olefins.

More specifically, the process of this invention comprises contacting a petroleum fraction from a refinery stream containing mixtures of normal 1-olefins and branched 1-olefins with a Ziegler-Natta catalyst at temperatures of about −70 to 100° C., preferably at about 40 to 100° C., and atmospheric pressure. The polymerization is continued until a homopolymer of suitable molecular weight is obtained, additional solvent is added to the retaction mixture, and the solid catalyst is then removed by known means. The remaining olefins are recovered by distillation and the polymer by addition to a polar solvent, generally an alcohol.

Refinery streams or fractions thereof that are useful in the process of this invention are those streams and fractions containing 1-n-olefins having at least 4 carbon atoms in the olefin molecule and preferably at 5–12 carbon atoms. Such streams usually contain one or more alkanes such as pentane, octane, or dodecane. The branched olefins to be separated from the 1-n-olefins are preferably 2-lower alkyl-1-olefins such as 2-methyl-1-pentene, or 2-ethyl-1-hexene.

The amount of acetylene, reactive diolefins, and aromatics in the refinery stream should be minimal and are preferably absent. A stream of mixed olefins containing substantial amounts of alkanes, such as pentane and hexane, can be utilized without additional solvent. Where additional solvent is required, solvent is added to obtain a ratio of about 3–5:1 olefin to inert hydrocarbon solvent. Particularly desirable refinery streams are distillation cuts of light catalytic gasoline and streams resulting from wax cracking.

The Ziegler-Natta catalysts useful in the process of this invention are well known (see U.S. Patent 2,943,063 issued to L. T. Eby et al. on June 28, 1960, and U.S. Patent 2,910,461 issued to G. Nowlin et al. Oct. 27, 1959). These catalysts are the reaction product of a transition metal compound, preferably $TiCl_3$ or $TiCl_4$, and a metal alkyl, preferably aluminum triethyl.

The amount of catalysts used in the process is within the range of about 20–100:1 of olefin to transition metal compound by weight. The catalysts are formed from the transition metal compound and metal alkyl in ratios of about 1:2–3 by weight. Solvents in which the catalysts can be prepared and in which the separation polymerization is carried out are inert hydrocarbons which are preferably aliphatic hydrocarbons having about 4–10 carbon atoms.

The reaction time required by the process varies with the catalyst used, the reaction temperatures, olefinic raw material, etc. However, complete separation of the normal 1-olefins from the remaining olefins is assured by periodically, or continuously, determining the reaction mixture viscosity. The viscosity of the mixture increases as the polymerization progresses, and levels off when the polymerization is substantially complete. The reaction is stopped at this time.

These measurements can be obtained readily by positioning a viscometer in the reaction mixture. A Brookfield-type viscometer can be fitted into the reaction vessel and is preferred for this purpose.

While, as above indicated, the catalyst separation techniques of the prior art can be used to remove catalysts from the reaction mixture prior to removing the unreacted olefins, I prefer to remove the catalysts from the reaction mixture by adding sufficient solvent; i.e., alkanes or aromatic hydrocarbons, to the mixture to dissolve the polymer. The solid catalyst is then removed by usual solid removal techniques such as centrifugation and decantation. At this point, the unreacted olefins are distilled from the reaction mixture. The polymer is purified, after removal of the unreacted branch chain olefins, by washing the solution of polymer with water or dilute aqueous mineral acid and precipitating the polymer from solution with a polar solvent such as methanol or isopropanol.

The following examples more fully illustrate my invention, but it is not intended that the invention be limited to the exact mixtures, reaction temperatures, solvents, etc., shown. Rather, it is intended that all equivalents obvious to those skilled in the art be included within the scope of my invention as claimed.

*Example I*

A Ziegler catalyst was preformed by reacting 1.54 g. (0.01 m.) of aluminum reduced $TiCl_3$ in about 25 cc. of n-heptane with 2.3 g. (0.02 m.) of aluminum triethyl in about 25 cc. of n-heptane. The reaction was carried out in a hydrocarbon solvent in a prepurified nitrogen purged glove box containing a $P_2O_5$ desiccant and then removed from the glove box for the separation reaction. The reaction flask was equipped with stirrer, condenser, drying tube, thermometer, and the olefin mixtures were added under a prepurified nitrogen stream. The nitrogen stream was discontinued after olefin addition.

A mixture of 10 g. of 1-n-pentene and 10 g. of 2-methyl-1-butene in 20 cc. of n-heptane was added to the catalyst mixture. The reaction temperature rose from room temperature to about 54° C. in about 5 to 10 minutes. The mixture cooled to 48° C. after which little further exotherm was obtained. The polymerization mixture was then maintained at about 50° C. for a period of 6 hours.

After standing overnight, the thick, black polymer mixture was dissolved in n-heptane and centrifuged to remove the catalyst. After the solution had been decanted from the catalyst, it was washed with dilute aqueous HCl until colorless and then added to an excess of methanol to precipitate the white nontacky polymer. After drying, the yield of polymer was 97% based on 1-pentene. The polymer is essentially pure poly-1-pentene. The unreacted 2-methyl-1-butene and 2-methyl-2-butene, formed by isomerization, are received by distillation.

Example II

A polymerization was carried out as described in Example I, except that the reaction period was 16.5 hours instead of 6 hours. The viscous polymer material obtained was dissolved in n-heptane, centrifuged and decanted to remove most of the catalyst. The n-heptane solution was then distilled over a 25–90° C. range. The range was purposely large to make sure that all of the olefin was recovered. A G.L.C. analysis of this cut, which amounted to 52.2 g., showed that it was 81.7% n-heptane, 5.0% 2-methyl-1-butene and 14.2% 2-methyl-2-butene. No 1-pentene was found. The recovered isoamylenes thus amounted to 10.0 g.—a 100% recovery of isoamylene.

The polymer in the undistilled n-heptane solution was precipitated by the addition of methanol. After the polymer was dried in a vacuum oven at 40–50° C. for several hours, it amounted to 10.0 g.—accounting for 100% of the starting 1-pentene and showing a complete separation of 1-n-olefin as a polymer from the remaining isoamylenes which were recovered by distillation.

Example III

The same quantities of olefins and solvent and the same reaction conditions as Example II were used, except that 1.9 g. (0.01 m.) of $TiCl_4$ and 3.4 g. (0.03 m.) of aluminum triethyl were used to make the Ziegler catalyst.

On addition of the olefin mixture to the catalyst suspension, a 6° C. exotherm was observed. The polymerization mixture was maintained at about 53° C. for 15.5 hours. The resulting viscous polymer material was dissolved and centrifuged as in previous examples and then distilled. A 25–90° C. cut was taken to insure complete olefin recovery and the remaining n-heptane solution was added to anhydrous methanol to precipitate the polymer. After drying, the polymer weighed 10.0 g.

G.L.C. analysis of the distilled cut showed that it was 87.3% n-heptane, 5.3% 2-methyl-1-butene and 9.2% 2-methyl-2-butene with trace amounts of 1-pentene and 2-pentene. Again, an excellent separation of 1-pentene from 2-methyl-1-butene with some isomerization of the 2-methyl-1-butene was observed.

Example IV

A polymerization was carried out by the procedure of Example I utilizing, as catalyst precursors, 8.0 g. (0.07 m.) of aluminum triethyl and 13.3 g. (0.07 m.) of $TiCl_4$. The catalyst was prepared in 150 cc. of n-heptane. A mixture of 80 g. of 1-n-pentene and 80 g. of 2-methyl-1-butene in 200 cc. of n-heptane was added to the catalyst solution. The polymer mixture was worked up, as described in Example I, after being maintained at about 52–60° C. for 5.5 hours. After drying in a vacuum oven, 77.3 g. of polymer (96.7% yield based on 1-pentene) was obtained. The polymer had an infrared spectrum that was essentially identical to that of poly-1-n-pentene prepared independently.

Example V

Following the procedure of Example I and utilizing a catalyst made of 0.5 g. of $TiCl_4$ and 0.9 g. of aluminum triethyl and 50 cc. of pure, dry n-heptane; a mixture containing 5 g. each of the 5 isomeric pentenes and 20 cc. of n-heptane was heated with the catalyst at 54° C. for 6 hours. The recovered crude polymer amounted to 4.5 g. or a 90% yield, based on 1-pentene content.

Example VI

Utilizing the procedure of Example V, except that a mixture of 0.95 g. of $VCl_4$ and 0.95 g. $TiCl_4$ was added to 3.4 g. of aluminum triethyl in n-heptane and the solution was heated at 54° C. for 5.2 hours. A yield of 5.0 g. polymer was obtained. This amounts to 100% of the 1-n-pentene in the original reaction mixture.

Example VII

Following the procedure of Example V, 1.9 g. of $TiCl_4$ was added to 5.9 g. of aluminum tri-isobutyl and n-heptane and the solution heated to 52° C. for 4 hours. The yield of polymer was 1.5 g.

Example VIII

A catalyst was prepared in a glove box by utilizing the technique of Example I by adding 1.9 g. of $TiCl_4$ and 25 cc. of n-heptane to 3.4 g. of aluminum triethyl in 25 cc. of n-heptane with stirring. To the precipitated black catalyst a mixture of 10 g. each of 1-n-pentene, 1-n-hexene, 1-n-heptene, and 1-n-octene in 77 cc. n-heptane was added. The solution was stirred vigorously and the $N_2$ flow was discontinued as the solution temperature rose from about 38° C. to about 92° C. over a 10–15 minute period. The polymerization solution became very viscous, the stirring was maintained for another 1–1.4 hours. The polymer solution was added to acidified methanol and the resulting tacky, rubbery polymer recovered and dried. After drying, the white polymer weighed 36.2 g. (a 90.5% yield).

Example IX

Following the procedure of Example VIII, the normal olefins in a wax cracking stream are polymerized and separated from the small amount of branched chain olefins in the stream at excellent yields. Such streams normally contains $C_5$–$C_8$ olefins and yield the tetrapolymers of Example VIII.

Example X

Catalyst was prepared by adding 1.2 g. of aluminum triethyl in about 10 cc. of n-heptane to 0.8 g. of $TiCl_3$ in about 40 cc. of n-heptane with efficient stirring in an $N_2$ purged dry box. To the catalysts mixture was added a distillation cut of light catalytic gasoline that consisted of 1.19 g. 1-pentene, 8.65 g. 2 - methyl - 1 - butene and 3.82 g. of isopentane. This mixture was heated with stirring for about 22 hours at a temperature of 45–8° C. Additional n-heptane was then added to dissolve the polymer and the insoluble catalyst was removed by centrifugation and decanation. The unreacted olefins were recovered by distillation and the polymer precipitated by addition of the n-heptane solution to methanol. After drying the polymer weighed 0.912 g. which amounted to a 76.6% yield based on 1-pentene in the feed.

Example IX

In an experiment carried out as in Example X, a light catalystic gasoline fraction containing 5.5 g. of 1-pentene, 6.5 g. of 2 - methyl - 1 - butene, and 3.1 g. of isopentane was treated with a catalyst prepared from 1.4 g. of $AlEt_3$ and 0.9 g. of $TiCl_3$ in about 70 cc. of n-heptane. The unreacted olefins and poly - 1 - pentene were recovered as described in the preceding example. A total of 2.9 g., or a 52.7% yield of poly - 1 - pentene was obtained.

Now having described my invention, what I claim is:

1. The process comprising separating 1 - n - monoolefins from mixtures of 1 - n - monolefins having at least 4 carbon atoms with olefins having at least 4 carbon atoms selected from the groups consisting of internal olefin(s), 2 - lower alkyl substituted - 1 - monolefin(s), mixtures thereof and mixtures with alkanes comprising contacting the mixture, at temperatures of from about −70 to about 100° C. with a Ziegler catalyst reaction product of titanium halide and triorgano aluminum reacted at reactant ratios of about 1:1–3 transition metal halide to triorgano aluminum and separating the polymer formed thereby.

2. The process of claim 1 wherein the mixture of hydrocarbons is a liquid refinery stream.

3. The process of claim 1 wherein the reactant ratios are 1:2–3.

4. The process of claim 1 wherein the refinery stream is contacted with a Ziegler catalyst at about 40–100° C., at atmospheric pressure, and where the Ziegler catalyst is the reaction product of the transition metal halide selected from a group consisting of titanium trichloride and titanium tetrachloride, and the metal alkyl is aluminum triethyl.

5. The process of claim 1 wherein the refinery stream is a cut of light catalytic gasoline containing 1 - n - pentene, 2 - methyl - 1 - butene, and isopentane.

6. The process of claim 1 wherein the refinery stream is a stream resulting from wax cracking.

7. The process of claim 1 wherein the refinery stream contains olefins having 5–12 carbon atoms.

8. The process for separating mixtures of 1 - n - monoolefins having at least 4 carbon atoms with olefins having at least 4 carbon atoms selected from the group consisting of internal olefin(s), 2 - lower alkyl substituted-1 - monoolefin(s), mixtures thereof and mixtures with alkanes comprising contacting the mixture of olefins with catalytically effective amounts of Ziegler catalyst at temperatures from about −70 to about 100° C. and separating the resulting homopolymer of the 1 - n - monoolefin.

9. The process of claim wherein the 1 - n - monoolefins have 5–12 carbon atoms.

10. The process of claim 8 wherein the temperature is maintained at from about 40 to about 100° C.

References Cited
UNITED STATES PATENTS

| | | | |
|---|---|---|---|
| 2,751,331 | 6/1956 | Alpert et al. | 260—677 |
| 2,970,133 | 1/1961 | Sistrunk | 260—93.7 |
| 2,920,066 | 5/1960 | Nowlin et al. | 260—94.9 |
| 2,951,067 | 8/1960 | Cash | 260—94.9 |
| 3,225,023 | 12/1965 | Hogan et al. | 260—80.5 |
| 3,261,821 | 7/1966 | Vandenberg | 260—94.9 |

FOREIGN PATENTS 827,365  2/1960  Great Britain.

JOSEPH L. SCHOFER, *Primary Examiner.*

L. EDELMAN, *Assistant Examiner.*